Aug. 14, 1956  W. C. McFADDEN  2,758,526
CURTAIN SHUTTER ROLLER BRAKE
Filed May 5, 1952
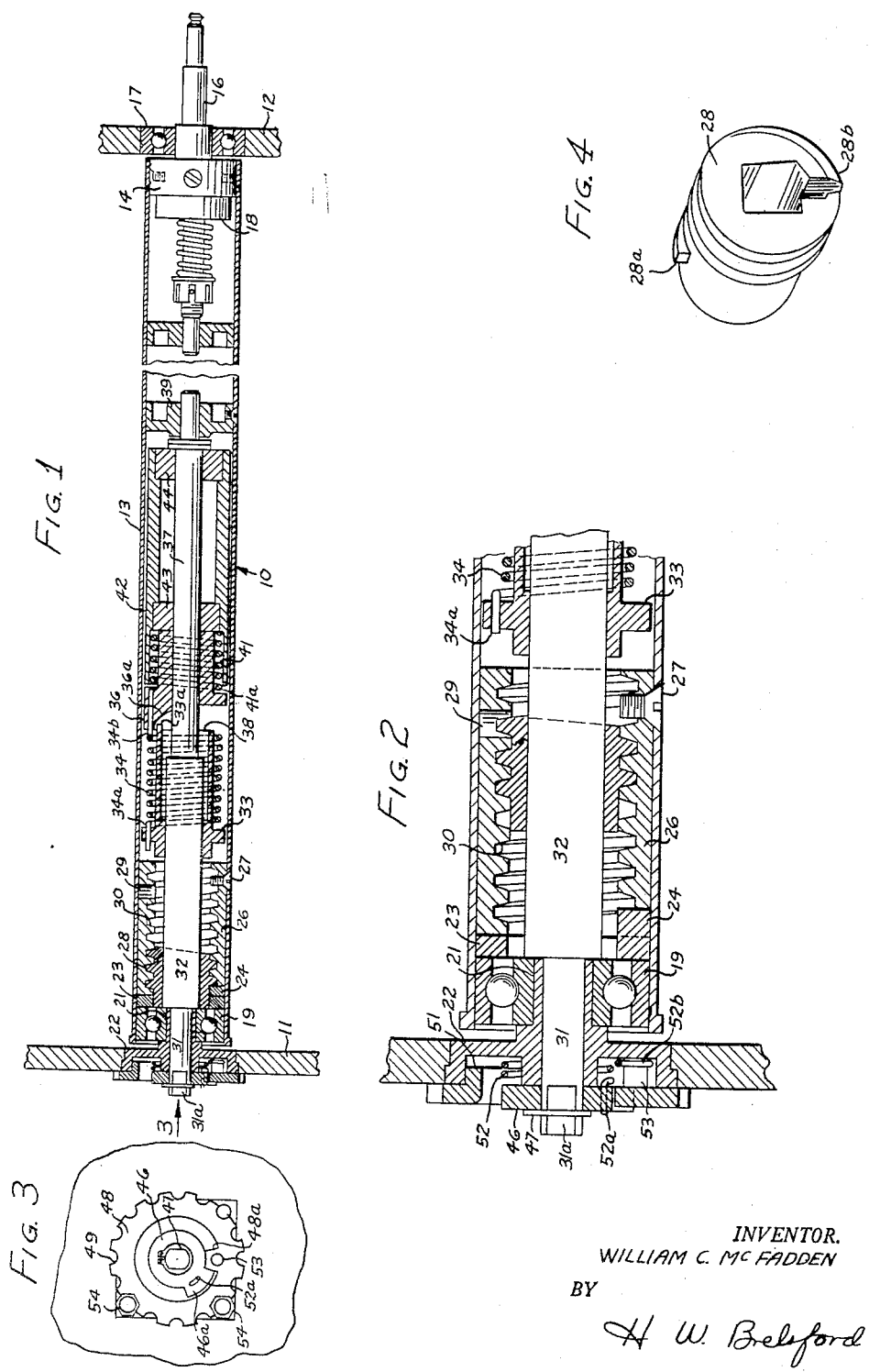
INVENTOR.
WILLIAM C. McFADDEN
BY
H. W. Belsford United States Patent Office 2,758,526
Patented Aug. 14, 1956

2,758,526

CURTAIN SHUTTER ROLLER BRAKE

William C. McFadden, La Canada, Calif., assignor to Hycon Mfg. Company, Pasadena, Calif., a corporation of Delaware Application May 5, 1952, Serial No. 286,154

3 Claims. (Cl. 95—57)

My invention relates to braking mechanisms of the inertia type and has particular reference to such a mechanism as adapted to brake the shutter rollers of cameras having focal plane shutters.

The dissipation of the energy of momentum of focal plane shutter mechanisms becomes an urgent problem in large size cameras such as those used for serial photography. In such cameras a capping curtain is employed in addition to the shutter curtain, and both must have a regulated deceleration at the end of their stroke to insure proper operation and to reduce stresses. Each end of each curtain is mounted on a roller and the pair of rollers for any one curtain are simultaneously rotated in the same direction to transport the curtain over the exposure area of the camera.

The shutter curtain of such cameras is constructed to expose the film while moving in one direction only and accordingly must be retracted to a starting position before it is ready for the next exposure. The capping curtain is therefore provided to shield the film from light as the shutter curtain is retracted. Upon completion of the retraction of the shutter curtain, the capping curtain is withdrawn and the shutter mechanism is ready for the next exposure.

Both the capping curtain and the shutter curtain may be driven by heavy springs for operation and are withdrawn or retracted by motors. Large inertia forces build up during the operation movement, including not only the rotating inertia in each pair of rollers, but the lineal inertia of the moving curtain. If the curtains are brought suddenly to the end of their motion, the inertia forces cause heavy stresses, and the curtains flap, exposing the film. For this reason a regulated deceleration of the rolls and curtains is necessary at the end of each stroke or operation movement.

The present development wastes the energy of momentum of the curtain mechanims by employing it to accelerate a rotable mass. Hence the present brake may be referred to as an inertia type of brake since the curtain mechanisms are slowed down and stopped by spinning a braking mass having considerable inertia.

It is therefore a principal object of my invention to provide a camera braking mechanism that is predictable, reliable and regulatable in its operation.

Another object is to provide an inertia brake for focal plane shutter mechanisms.

Still another object is to provide a brake actuating mechanism to apply the braking action at a preselected point in the motion cycle of a shutter mechanism.

A further object is to provide an inertia brake having a high braking effect to decelerate shutter mechanisms over a small part of the motion cycle.

Another object is to provide an inertia brake that is disposed within the cylindrical shutter rollers.

Other objects and advantages will be apparent in the following description and claims considered together with the accompanying drawings forming an integral part of this specification and in which:

Fig. 1 is a sectional elevation view through a roller embodying my invention, showing the roller mounted in a magazine frame and showing the shuttle in roller starting position;

Fig. 2 is an enlarged sectional view of the shuttle portion of Fig. 1 showing the shuttle in the brake actuating position;

Fig. 3 is an end view of the roller mounting of Fig. 1 showing the mounting of the indexing spring; and Fig. 4 is a perspective view of the shuttle of Figs. 1 and 2, but rotated 180° on its axis for purposes of clarity.

Referring to Fig. 1 there is illustrated a roller 10 mounted at each end in frame plates 11 and 12. The roller 10 may be used for the shutter curtain or the capping curtain and may be either the driving or the driven roller of each pair associated with each curtain. The brake is preferably applied to the roller from which the curtain is unwinding, although it is desirable also to apply a braking force to the roller on which the curtain is winding. The invention will be described with reference to a roller which may be the driving roller or the driven roller for this reason.

The exterior of the roller 10 may be defined by a cylindrical shell 13 which may have an annular insert 14 in the right end through which may project a spindle 16 mounted for rotation within a ball bearing assembly 17 mounted in the frame 12. For purposes of illustration the roller of Fig. 1 may be a driven roller to which no power is directly applied during the actuation period of the curtain which is rolled upon it. At the completion of its actuation rotation a motor force may be applied to the spindle 16 to rotate the roller 10 back to its starting position. A clutch mechanism 18 accordingly may be provided for the spindle 16 to prevent damage in the event that the curtain wound on the roller does not function smoothly upon motor retraction. If the roller 10 were a driving roller a suitable driving spring could be substituted for the clutch mechanism 18.

Inserted in the left end of the cylindrical shell 13 may be a ball bearing assembly 19 which fits over a projecting tubular spindle 21 which forms part of a larger bushing 22 mounted within the frame member 11. The entire roller thus is supported and rotates upon the ball bearing 19 at the left end and the ball bearing 17 at its right end.

Disposed within the left end of the shell 13 may be a washer 23 having a projecting lug 24 formed thereon. An internally threaded tubular member 26 may be securely held to the shell by suitable fasteners such as a screw 27. The projecting lug 24 may be keyed into the threaded member 26 by means of the lug fitting a mating notch. The tubular member 26 may have internal threads 30 which are engaged by an externally threaded shuttle 28 illustrated most clearly in Fig. 4. A pin 29 projecting into the threaded member 26 across one of its thread roots in the right end thereof serves as a stop for relative rotation between the tubular member 26 and the shuttle 28 on one end and the lug washer 23 serves as a stop for the shuttle at the other end of the member 26.

Supported in bushing 22 may be a round shaft 31 having an enlarged squared portion 32 at its inner end. The shuttle 28 may be formed with a square hole axially therethrough and accordingly may slide over the square shaft 32. Throughout most of the operation of the roller 10 the squared shaft 32 is stationary and accordingly the shuttle 28 does not rotate except during the braking action. Therefore, the shuttle is slid longitudinally along the squared shaft 32 because of the rotation of the internally threaded tubular member 26 rigidly connected to the roller shell 13.

Also mounted on the squared shaft 32 may be a shock spring carrier 33 having a suitable square aperture axially therethrough for a driving connection between the carrier and shaft 32. A helical spring 34 may be disposed about the carrier 33 and one end 34a of the spring may have a driving connection with the carrier by passing through a suitable flange on the carrier. The other end of the spring 34 designated as 34b may pass through a suitable aperture in a driving hub 36 of a spring clutch. The clutch hub 36 may have a round axial hole therethrough and may be mounted for rotation upon a round shaft 37, one end of which may be journaled in a sleeve 38 inserted in the right end of the shock spring carrier 33. The other end of the shaft 37 may be mounted in a spider 39 snugly fitted within the cylindrical shell 13. Shafts 31, 32 and 37 may be formed as one piece.

The torque transmitting member for the clutch may be in the form of a helical spring 41 having one end 41a locked to the driving clutch hub 36 and the other end of the spring 41 may be free. Closely fitting over the helical spring 41 and engaging it with a light frictional load may be the internal surface of one end of a tubular inertia member 42 mounted for rotation on the shaft 37 by means of sleeves 43 and 44 press fitted to the tubular rotor 42.

The shock absorber spring 34 is preferably preloaded in order to obtain a maximum shock absorption with the lightest weight of spring possible. Accordingly, a lost motion connection may be provided between the spring carrier 33 and the driving clutch member 36 in the form of a projection 33a at the right end of the carrier 33 which may fit within a milled slot 36a in the clutch member. This slot, 36a, may be wide enough to permit 120 to 180 degrees of motion between the two members. The shock absorption spring 34 accordingly may be wound to preload the spring to obtain a preload with the necessary quantitative torque transmitting ability. When this preload has been obtained the member 33 and the member 36 may be moved together so as to interfere with each other as illustrated in Fig. 1.

The travel of the shuttle 28 along the square shaft 32 must be precisely determined so that the braking action will be initiated at the precise instant. For example, in one camera embodying the invention the length of travel of the curtain to effect its operation is measured by revolutions of the roller and is four and one-fourth rotations of the roller. At the end of this operation of the curtain the brake is applied and the roller is decelerated to a stop during the next three-quarters of one turn. The total rotation of the roller accordingly is five rotations. It is therefore important to maintain the square shaft 32 in the correct angular position so that this precise adjustment may be obtained and maintained. For this purpose a projecting end of round shaft 31 connected to squared shaft 32 is flatted as at 31a. A washer 46 may be placed over this flatted projecting end of shaft 31 and held securely thereon by a snap ring 47. The washer 46 may have a projecting ear 46a. Disposed about the washer 46 in spaced arrangement may be a ring 48 having semicircular serrations 49 on the outer edge thereof and having a laterally extending flange 51 that fits within the bushing 22 in which shaft 31 is journaled. The ring 48 may have an inwardly projecting tongue 48a which projects into the path of the ear 46a of the washer when it rotates as the shaft rotates. As illustrated most clearly in Fig. 3 this projecting tongue 48a and the projecting ear 46a are of such angular extent that the entire shaft 31 may rotate approximately three-quarters of a turn or 270 degrees.

The shaft 31 and its associated square shaft 32 are held in the angular position illustrated by virtue of the ear 46a abutting against the tongue 48a, and being urged to that position by a spiral spring 52. One end of the spiral spring may be secured in a hole in the projecting ear 46a as at 52a and the other end of the spiral spring may be secured to a pin 53 projecting inwardly from the tongue 48a, as at 52b. The spiral spring 52 therefore urges the shaft 31 to a normal position determined by the setting or abutting of the tongue 46a against the tongue 48a. The spring is, however, weak enough so that it does not interfere with either the action of the shock absorbing spring 34 or the clutch spring 41. The angular position of tongue 48a may be varied to the precise setting desired by means of rotation of the entire ring 48 effected by removing bolts 54 that hold it in position and rotating the ring to the desired position and thereafter moving it minutely until the serrations 49 align themselves with the stems of the bolts 54, thereby locking the angular position of the ring 48 and its associated tongue 48a.

Illustrated in Fig. 4 is the shuttle 28 showing the faces on the threads that are used as stops for the threading action of the shuttle within the cylinder 10. The threads may be formed as raised parts on the cylindrical body of the shuttle 28 and on the left end of the shuttle the thread may terminate in a plane face 28a disposed in a plane through the axis of revolution of the shuttle proper. The face at the other end of the shuttle may extend from the square central hole through the shuttle to the exterior of the thread and accordingly, a thread terminating face 28b may be formed on this right end. It is this face 28b that is struck by the pin 29 as illustrated in Fig. 2 but for purposes of clarity in Fig. 4 the entire shuttle has been rotated 180 degrees from its normal position.

*Operation*

The roller 10 is preferably one of a pair wherein the curtain is wound upon the roller 10 prior to operation of the camera. The curtain may be either a shutter curtain or a capping curtain. The roller 10 may be forced into operation because of the drive of the opposite roller of the pair pulling the curtain from the roller 10 and causing it to accelerate to an operational speed. As the roller 10 rotates, the outer shell 13 will cause the internally threaded tube 26 secured to it to slide the shuttle 28 to the right on the squared shaft 32. These threads on the tubular member mate with the threads on the shuttle 28 and cause it to slide because the squared shaft is held in a stationary position by the cocking spring 52 disposed on the outer side of the dished bushing 22. Upon completion of the operation stroke of travel of the curtain the shuttle will have slid to the position illustrated in Fig. 2. The shuttle face 28b (Fig. 4) will have slid into the path of travel of the pin 29 and will be struck by the pin 29 carried in the threaded tube 26.

The pin 29 drives the shuttle 28 in rotation, which in turn rotates squared shaft 32 overcoming the weak cocking spring 52. The carrier 33 mounted on the square shaft 32 also rotates, transmitting its motion through the preloaded spring 34 to drive the clutch hub 36 to which the spring is attached. The hub 36 rotates the helical clutch spring 41 connected to it. Since this clutch spring lightly engages the rotor 42 the frictional forces tend to spread or unwind the spring causing its diameter to increase as it is driven by the clutch hub 36. This causes the spring 41 to grip the rotor 42 to spin it, dissipating the rotative energy of the roller.

The entire roller may be braked from full rotative speed to a stop in any desired angular travel for example, three-fourths of one revolution. Thereupon, the squared shaft 32 stops its braking rotation but since the rotor 42 is already spinning it will, in effect wind up the clutch spring 41 reducing its diameter and thus releasing the engagement between the clutch and the rotor 42. The clutch permits the rotor to overrun or turn freely but with a slight frictional drag which eventually brings the rotor to a stop. The cocking spring 52 rotates the squared shaft 32 back to its normal cocked position. A motor drive acting on the shaft 16 may then rewind the roller 10 to its starting position causing the shuttle 28 to slide to the left to its starting position illustrated in Fig. 1.

The overrunning clutch is a quick-acting type and ordinarily not over 5 degrees of angular movement are necessary to cause it to be fully engaged. The spring 34 acts as a shock absorber to reduce high mechanical stresses, storing the temporary peak of energy induced by the pin 29 striking the shuttle 28 and accelerating the entire mass of the shaft 32, the carrier 33, the clutch hub 36, and the rotor 42. The lost motion connection formed by the pin 33a projecting in the slot 36a permits sufficient energy storing during this initial movement and this may be on the order of from 90 degrees to 180 degrees of relative movement before the clutch hub 36 and the rotor tube 42 are driven into full spinning motion. The stored energy thereupon acts to accelerate the clutch hub faster than the squared shaft 32 is moving at that particular instant.

The precise instant at which the brake comes into operation is determined by the rotary position of the shaft 32 which in turn positions the point of time in the rotation of the roller 10 that the shuttle is struck by the pin 29. This is accomplished by the positioning of the projecting ear 46a on the washer 46 abutting against the projecting tongue 48a of the serrated ring 48. These two members are held in abutment by the cocking spring 52 connected between them. The washer 46 is keyed to the circular shaft 31 which is the mechanical continuation of the squared shaft 32. When the braking point must be adjusted the bolts 54 holding the ring 48 in place are removed and the ring rotated until a new set of serrations are opposite the hold down bolts 54 or their tapped holes.

The duration of the rotation of the roller 10 before the brake is brought into play is determined by the length of the threaded tube 26 between its left end and the pin 29. In one embodiment of the invention the roller 10 was permitted four and one-fourth turns to effect operation of the curtain and the entire motion was braked during the ensuing three-quarters of one turn. Thus the entire cycle including a braking action took place in five complete revolutions. This was sufficient to bring the rotative speed of the inertia tube 42 up to a speed of many hundreds of revolutions per minute, the energy of which was dissipated over a period of about ½ second.

While I have described my invention with respect to specific embodiment thereof, it will be obvious to those skilled in the art that various modifications could be made therein without departing from the true spirit and scope of my invention. For example, mechanisms other than a shuttle could be employed to initiate the braking action. Also, gearing could be interposed between the shock spring carrier 33 and the rotor 42 to increase its rotative speed where greater braking action is desired. Alternatively, the gear mechanism could be placed ahead of the spring carrier 33 in the assembly of parts. For greatest simplicity of construction the axis of the inertia member 42 is preferably the same as the roller but obviously there could be different positions for this axis. For these and various other reasons I do not limit myself to the structure disclosed but claim all modifications as fall within the true spirit and scope of my invention.

I claim:

1. A shutter roller comprising: a hollow circular cylinder; means mounting the cylinder for rotation; an inertia rotor rotatably disposed within the cylinder; an overrunning clutch having a driving end coupled to the rotor and having a driven end; a drive shaft rotatably disposed within the cylinder and coupled to the driven end of the clutch; resilient means for yieldingly holding the drive shaft at a preselected normal position; a mechanical cycling mechanism driven by the cylinder and coupling the cylinder to the drive shaft at a preselected point in the rotation of said cylinder, whereby the cylinder drives the shaft through the cycling mechanism at the point selected by the coupling mechanism and the normal position of the drive shaft, to thereupon drive the rotor which in turn absorbs the rotative momentum of the cylinder.

2. In a focal plane shutter for cameras, a roller construction comprising: a shutter frame; a hollow circular cylinder mounted for rotation on the frame; an inertia rotor disposed within the cylinder; means mounting the rotor for rotation; a drive shaft rotatably mounted within the cylinder; resilient means connected to the frame for yieldingly holding the drive shaft at a selected rotary position; a cycling mechanism driven by the cylinder coupling the cylinder to the drive shaft for rotation of the drive shaft at a preselected point in the rotation of said cylinder; an overrunning clutch having a drive end coupled to the rotor and having a driven end; and a shock absorber connecting the drive shaft to the driven end of the clutch, whereby the cylinder drives the shaft through the cycling mechanism to rotate the rotor to absorb the rotative momentum of the cylinder to effectively brake the cylinder.

3. A shutter roller comprising: a hollow circular cylinder; means mounting the cylinder for rotation; an inertia rotor rotatably mounted within the cylinder and having a rotative inertia at least as great as the approximate rotative inertia of the cylinder; an over-running clutch having a driving end coupled to the rotor and having a driven end; a drive shaft rotatably disposed within the cylinder and coupled to the driven end of the clutch; and a cycling mechanism coupling the cylinder to the drive shaft at a preselected point in the rotation of said cylinder, whereby the cylinder drives the shaft through the cycling mechanism at the point selected by the coupling mechanism to drive the rotor which in turn absorbs the rotative momentum of the cylinder.

References Cited in the file of this patent

UNITED STATES PATENTS

| | | |
|---|---|---|
| 778,660 | Hadden | Dec. 27, 1904 |
| 1,187,077 | MacCune | June 13, 1916 |
| 1,626,032 | Fairchild | Apr. 26, 1927 |
| 2,037,360 | Barenyi | Apr. 14, 1936 |
| 2,397,546 | Harris | Apr. 2, 1946 |

FOREIGN PATENTS

| | | |
|---|---|---|
| 13,980 | Great Britain | of 1901 |
| 672,679 | France | Sept. 23, 1929 |
| 657,620 | Great Britain | Sept. 26, 1951 |